UNITED STATES PATENT OFFICE.

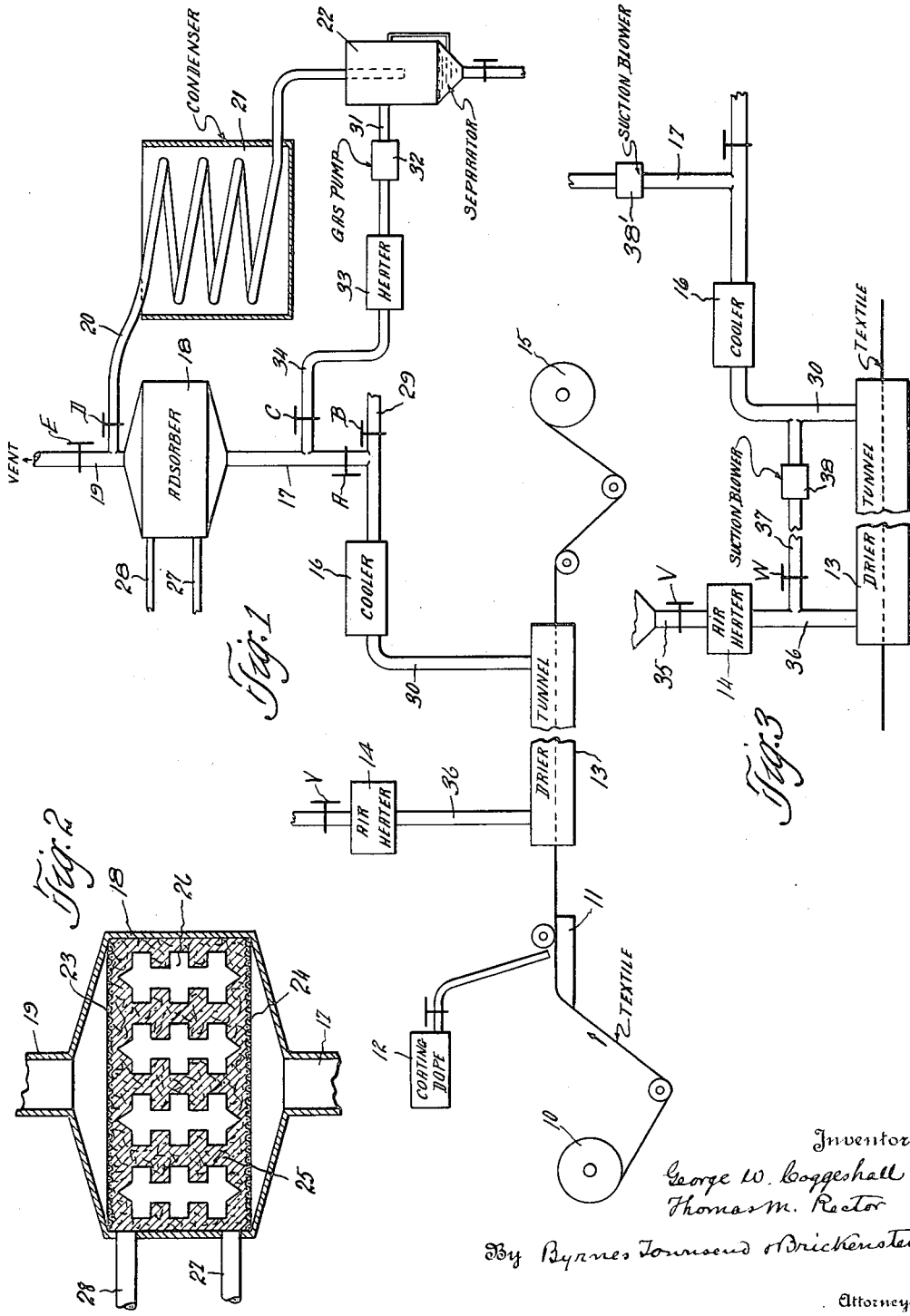

GEORGE W. COGGESHALL AND THOMAS M. RECTOR, OF WASHINGTON, DISTRICT OF COLUMBIA, ASSIGNORS TO THE INSTITUTE OF INDUSTRIAL RESEARCH, INC., OF WASHINGTON, DISTRICT OF COLUMBIA, A CORPORATION OF THE DISTRICT OF COLUMBIA.

PROCESS FOR THE RECOVERY OF VOLATILE SOLVENTS.

1,418,363. Specification of Letters Patent. Patented June 6, 1922.

Application filed March 11, 1920. Serial No. 365,104.

*To all whom it may concern:*

Be it known that we, (1) GEORGE W. COGGESHALL and (2) THOMAS M. RECTOR, citizens of the United States, residing at Washington, in the District of Columbia, have invented certain new and useful Improvements in Processes for the Recovery of Volatile Solvents, of which the following is a specification.

This invention relates to an improvement in methods of recovering volatile solvents, such as alcohol and the like from materials in or with which they have been used, e. g. in coating fabrics.

The residual solvent may be removed from the material to which the coating material has been applied or from material with which it has been associated in any other manner, by passing a current of gas, such as air over the material, the gas being warmed to a temperature sufficient to volatilize the solvent. The mixture of gas and solvent vapor is then brought into intimate contact with a suitable adsorbent, such as charcoal, iron-oxide, or, in particular, carbon which has been activated, as by heating and selective oxidation. The volatile vapors are adsorbed by the mass of adsorbent material, and the mass is then heated to volatilize the solvent which can be recovered by condensation.

We have devised a method of reducing the volume of fresh air needed, thereby increasing the concentration of solvent vapor in the air-vapor mixture passing to the adsorber.

We have also discovered that if a slow current of air, or of a gas of greater molecular weight, is passed through the adsorber during the heating of the adsorbent mass to drive off the vaporizable solvent, and this incondensible gas is passed along with the condensible vapors through the condenser that a larger percentage of vaporized solvent is removed from the mass of adsorbent in the same length of time than when no incondensible gas is so passed through. It has also been found to be advantageous to remove such gas from the condenser or collecting vessel, reheat it and again pass it through the heated adsorbent material. We have found that we may use air or other inert gas of greater molecular weight, such as $CO_2$. A further improvement is obtained when inert non-oxidizing gas, such as $CO_2$ for example, is used, which is that volatile solvents such for example as alcohol are not oxidized during the recovery process as often happens when air is circulated or no gas is circulated.

The mode of application of the invention will be understood from the accompanying description and drawing in which,—

Fig. 1 is a diagrammatic representation of the system;

Fig. 2 is a vertical cross section through the adsorber; and

Fig. 3 is a diagram of a modification.

Referring to Fig. 1, 10 is a roll of textile or other material, which is fed to a coating device 11, where the coating "dope," comprising coating material dissolved in the volatile solvent, is applied to the textile material, the dope being supplied from a tank, 12.

The coated material is then passed through a drier tunnel, in which the volatile solvent is driven off from the coated material by means of a current of heated air or other gas, supplied through pipe 36 from a suitable heater 14. The coated material passes out of the drier tunnel and is wound upon a roll, 15, or otherwise disposed of, in any well known way.

The mixture of volatile solvent and heated carrier gas, coming from the drier or chamber in which the material has been heated to drive off the solvent, passes through pipe 30, to a cooler 16, which may be of any suitable construction. In the cooler, the temperature of the mixture is lowered but not sufficient to cause condensation of the solvent vapor. From the cooler, 16, the mixed gas and vapors pass through pipe 17, provided with a valve A, to the adsorber 18, which has an exit pipe 19, provided with valve E. A pipe 20, having valve D therein, also connects exit pipe 19 to a condenser 21, from which the condensed solvent flows into receptacle 22. The branch pipe 29, leads from pipe 17 to one or more other adsorbers and has a valve B.

The adsorber may be made as shown in Fig. 2. Within the casing thereof, are mounted upper and lower perforated screens, 23 and 24, between which is contained the granular adsorptive material, 25. Also mounted between the screens are hollow members 26, through which heating or cooling fluids may be passed by means of pipes 27, 28, leading to a suitable source of supply of heating and cooling medium, such as steam or cold water.

These heating or cooling members should be constructed and arranged that they will provide surfaces extending as far as possible throughout the entire surrounding mass of adsorbent, thereby insuring that the whole mass is effectively heated or cooled, as the conditions require. The form of hollow member shown, is effective, but may obviously be varied in many other ways to obtain the desired result.

The closed receptacle 22 serves as a separator for the gas and condensed solvent, the gas being led through pipe 31 to pump 32, heater 33 and pipe 34, having valve C to pipe 17, leading into the adsorber.

The operation is as follows:—

The mixed gas and vapor, preferably after having been cooled to a suitable degree are passed through the adsorber where they are brought into intimate contact with the adsorbent material. It has been found to be generally advantageous to keep the adsorbent material cool during this adsorbing operation, and, therefore, cold water is passed through the members 26.

The volatile solvent is adsorbed by the activated carbon or other material while the carrier gas, passes out through exit 19, the valves A and E being open, and valves B and D and C being closed during this operation.

When the adsorbent material has taken up as much of the volatile solvent as it will or as is found precticable, the valves A and E are closed, valves B and D are opened, and heating fluid is supplied to the members 26, embedded in the adsorbent material. The adsorber solvent is thereby vaporized and the vapors are condensed in the condenser 21.

This volatilization is further largely assisted by the current of circulating warm gas coming from the heater 33 and passing up through pipe 34 into the adsorber, valve C being then open.

In the meantime, another adsorber has been connected through pipe 29, so that the recovery of solvent is uninterrupted. We have found that when activated carbon is used for adsorption, it is desirable to keep the mass cool, and that under proper conditions the activated carbon will adsorb from an air-alcohol vapor mixture an amount of alcohol almost equal in weight to that of the carbon itself. When the charged adsorber is heated to about 150° C., the alcohol vapor readily distils off.

In Fig. 3, the pipe 35 conveying fresh air to heater 14 has a valve V, and heated air is delivered through pipe 36 to the drier-tunnel. A by-pass pipe 37 connects pipes 30 and 36, and is provided with a suction-blower 38 and a valve W.

The operation of this apparatus is as follows:—

It has been found that in ordinary practice so much fresh air is passed through the drier that the concentration of solvent vapors in the air-vapor mixture issuing from the drier is low, and to reduce the volume of air, thereby increasing the vapor concentration, air-valve V is partly closed and air-valve W is partially or wholly opened so that with or without the assistance of the small air suction-blower 38, a certain portion of the heated air-vapor mixture issuing from the drier is passed through pipe 37 to pipe 36 and recirculated through the drier. The result is to increase the concentration of solvent vapors in that portion of the heated air-vapor mixture entering the cooler 16 and passing on to the adsorber. A further result of this arrangement is that less total air is heated in 14, less air-vapor mixture cooled in 16, a more rapid and complete adsorption of solvent vapors is made in the adsorber and by proper regulation of valves V and W and regulation of the speed of the suction-blower 38, the concentration of solvent vapor in the air-vapor mixture passing to the adsorber may be controlled and at the same time a slight suction may be produced in the drier in place of a slight air-pressure. This circulating system may be used independently of or in conjunction with that shown in Fig. 1. A slight suction prevents escape of air-vapor mixture into the workroom with its resultant disadvantages, not the least of which is the fire danger. Another suction blower 38', located in pipe 17, may be used, if desired.

The invention is in no way limited to the particular apparatus shown, and changes may be made therein without departing from the spirit of the invention. While we have referred to alcohol, obviously any other volatile solvents, whose vapors are capable of adsorption or occlusion, by solid materials of the kind referred to, can be recovered by the process described.

We claim:

1. The method of recovering condensable volatile solvents which have been adsorbed on solid materials with subsequent heating to drive off the adsorbed vapors characterized by this that during the heating a current of incondensable gas is passed over the adsorbent, the resulting mixed gas and vapor being passed through a condenser to condense said solvent and the incondensable gas being returned from the condenser and the adsorber during the heating operation.

2. The process as claimed in claim 1 in which the incondensible gas is heated during its passage from the condenser to the adsorber.

3. In the process of recovering volatile solvents by passing a current of heated non-condensible gas over material containing the solvent, the method of increasing the concentration of solvent vapors in the gaseous mixture which comprises circulating a portion of said mixture over said material, and then passing the enriched gaseous mixture over solid material capable of adsorbing the vapors.

In testimony whereof, we affix our signatures.

GEORGE W. COGGESHALL.
THOMAS M. RECTOR.